US009245183B2

(12) United States Patent
Haas et al.

(10) Patent No.: US 9,245,183 B2
(45) Date of Patent: Jan. 26, 2016

(54) GEOGRAPHICAL AREA CONDITION DETERMINATION

(71) Applicant: INTERNATIONAL BUSINESS MACHINES CORPORATION, Armonk, NY (US)

(72) Inventors: Richard M. Haas, Wellesley, MA (US); Randy S. Johnson, O'Fallon, MO (US); Tedrick N. Northway, Wood River, IL (US); H. William Rinckel, Prospect, CT (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/315,931

(22) Filed: Jun. 26, 2014

(65) Prior Publication Data
US 2015/0379344 A1  Dec. 31, 2015

(51) Int. Cl.
G06K 9/00 (2006.01)
G06K 9/46 (2006.01)
G06K 9/52 (2006.01)
G06K 9/62 (2006.01)

(52) U.S. Cl.
CPC ........ *G06K 9/00476* (2013.01); *G06K 9/00624* (2013.01); *G06K 9/46* (2013.01); *G06K 9/52* (2013.01); *G06K 9/6202* (2013.01); *G06K 9/6267* (2013.01); *G06K 2009/4666* (2013.01)

(58) Field of Classification Search
None
See application file for complete search history.

(56) References Cited

U.S. PATENT DOCUMENTS

| 7,193,508 | B2 | 3/2007 | Hill et al. |
| 7,643,653 | B2 | 1/2010 | Garoutte |
| 2008/0033652 | A1 | 2/2008 | Hensley et al. |
| 2009/0044235 | A1 | 2/2009 | Davidson |
| 2009/0088967 | A1* | 4/2009 | Lerner et al. ........... G01C 21/32 701/532 |
| 2009/0279734 | A1* | 11/2009 | Brown ................ G06K 9/0063 382/100 |
| 2010/0179936 | A1 | 7/2010 | Jeremiah |
| 2010/0278315 | A1 | 11/2010 | Goldman et al. |
| 2011/0080303 | A1 | 4/2011 | Goldberg et al. |
| 2013/0182108 | A1 | 7/2013 | Meadow et al. |
| 2013/0188008 | A1 | 7/2013 | Meadow et al. |
| 2013/0191252 | A1 | 7/2013 | Meadow et al. |

(Continued)

FOREIGN PATENT DOCUMENTS

WO 03051059 6/2003

OTHER PUBLICATIONS

Street Flooding Detection Method and System; IP.com; IPCOM000228210D; Jun. 13, 2013; 10 pages.

(Continued)

*Primary Examiner* — Jon Chang
(74) *Attorney, Agent, or Firm* — Schmeiser, Olsen & Watts; John R. Pivnichny

(57) ABSTRACT

A method and system for mapping the conditions of locations is provided. The method includes retrieving image data associated with a plurality of locations within a specified geographical area. The image data is compared to a plurality of stored image data that includes baseline measurement values associated with an expected condition level of baseline locations within a baseline geographical area. Condition score values associated with the plurality of locations are calculated. The condition score values indicate real time condition values associated with the plurality of locations. An overall condition score value associated with the specified geographical area is generated. A map indicating the overall condition score value is generated.

20 Claims, 9 Drawing Sheets

(56) References Cited

U.S. PATENT DOCUMENTS

| | | |
|---|---|---|
| 2013/0191292 A1 | 7/2013 | Meadow et al. |
| 2013/0191725 A1 | 7/2013 | Meadow et al. |
| 2013/0201340 A1 | 8/2013 | Meadow et al. |
| 2013/0201341 A1 | 8/2013 | Meadow et al. |
| 2013/0238356 A1 | 9/2013 | Torii et al. |
| 2014/0019166 A1* | 1/2014 | Swanson .............. G06Q 40/08 705/4 |
| 2014/0074733 A1* | 3/2014 | Den Herder .......... G06Q 10/10 705/306 |
| 2014/0324843 A1* | 10/2014 | Rapoport .......... G06F 17/30265 707/724 |
| 2015/0025914 A1* | 1/2015 | Lekas ................ G06K 9/00637 705/4 |

OTHER PUBLICATIONS

Friedman, Mark J.; List of IBM Patents or Patent Applications Treated as Related; Nov. 6, 2015; 1 page.

* cited by examiner

GEOGRAPHICAL AREA CONDITION DETERMINATION

FIELD

The present invention relates generally to a method for determining an overall condition of a geographical area and in particular to a method and associated system for generating a map illustrating the overall condition of the geographical area.

BACKGROUND

Determining location conditions typically includes an inaccurate process with little flexibility. Presenting the location conditions may include a complicated process that may be time consuming and require a large amount of resources. Accordingly, there exists a need in the art to overcome at least some of the deficiencies and limitations described herein above.

SUMMARY

A first aspect of the invention provides a method comprising: retrieving in real time, by a computer processor of a computing system, image data associated with a plurality of locations within a specified geographical area; comparing, by said computer processor, said image data to a plurality of stored image data, wherein said plurality of stored image data comprise baseline measurement values associated with an expected condition level of baseline locations within a baseline geographical area; calculating, by said computer processor based on results of said comparing, condition score values associated with said plurality of locations, wherein said condition score values indicate real time condition values associated with said plurality of locations; calculating, by said computer processor based on said condition score values, an overall condition score value associated with said specified geographical area; and generating, by said computer processor, a map indicating said overall condition score value associated with said specified geographical area.

A second aspect of the invention provides a computing system comprising a computer processor coupled to a computer-readable memory unit, said memory unit comprising instructions that when executed by the computer processor implements a method comprising: retrieving in real time, by said computer processor, image data associated with a plurality of locations within a specified geographical area; comparing, by said computer processor, said image data to a plurality of stored image data, wherein said plurality of stored image data comprise baseline measurement values associated with an expected condition level of baseline locations within a baseline geographical area; calculating, by said computer processor based on results of said comparing, condition score values associated with said plurality of locations, wherein said condition score values indicate real time condition values associated with said plurality of locations; calculating, by said computer processor based on said condition score values, an overall condition score value associated with said specified geographical area; and generating, by said computer processor, a map indicating said overall condition score value associated with said specified geographical area.

A third aspect of the invention provides a computer program product, comprising a computer readable hardware storage device storing a computer readable program code, said computer readable program code comprising an algorithm that when executed by a computer processor of a computing system implements a method, said method comprising: retrieving in real time, by said computer processor, image data associated with a plurality of locations within a specified geographical area; comparing, by said computer processor, said image data to a plurality of stored image data, wherein said plurality of stored image data comprise baseline measurement values associated with an expected condition level of baseline locations within a baseline geographical area; calculating, by said computer processor based on results of said comparing, condition score values associated with said plurality of locations, wherein said condition score values indicate real time condition values associated with said plurality of locations; calculating, by said computer processor based on said condition score values, an overall condition score value associated with said specified geographical area; and generating, by said computer processor, a map indicating said overall condition score value associated with said specified geographical area.

The present invention advantageously provides a simple method and associated system capable of determining location conditions.

DETAILED DESCRIPTION

Figure 1:
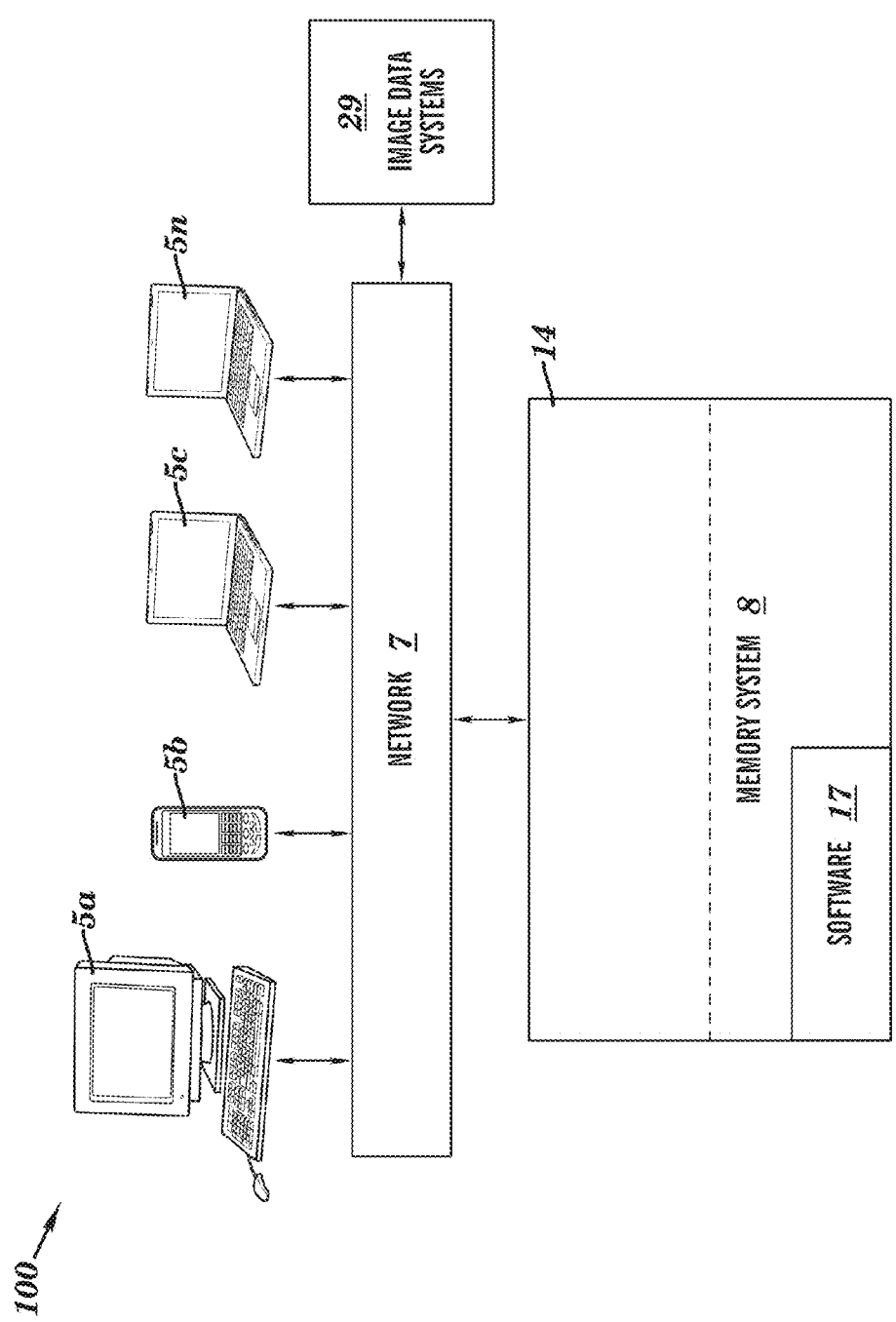
FIG. 1 illustrates a system for enabling a process for determining an overall condition of a geographical area, in accordance with embodiments of the present invention.

FIG. 1 illustrates a system 100 for enabling a process for determining an overall condition of a geographical area, in accordance with embodiments of the present invention. System 100 performs a process that includes:

1. Receiving a real time video feed (e.g., a video stream, still video images, etc.) from a plurality of cameras located in a geographical area (e.g., a neighborhood).
2. Pre-specifying a geographical area condition (e.g., health) measure.
3. Processing the real time video feed by comparing the real time video feed to stored video images corresponding to a specified measure.
4. Calculating a numerical value for the specified measure based on the comparison.
5. Generating a map depicting the geographical area and the numerical value.

System 100 of FIG. 1 includes devices 5a . . . 5n and image data systems 29 connected through a network 7 to a computing system 14. Network 7 may include any type of network including, inter alia, a local area network, (LAN), a wide area network (WAN), the Internet, a wireless network, etc. Devices 5a . . . 5n may include any type of computing devices or software systems including, inter alia, a computer (PC), a laptop computer, a tablet computer, a server, a PDA, a smart phone, a secure Website, an application, etc. Image data systems 29 may include any type of image data retrieval systems for retrieving image data (e.g., a video stream, still video images, etc.) from, inter alia, cameras (e.g., traffic cameras, security cameras, personal cameras, etc.), social networking Websites, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17.

Software 17 enables a process for identifying a condition or health of specific locations (e.g., a specified geographical are such as a neighborhood) through analysis of image data retrieved from image data systems 29. System 100 utilizes the image data to objectively determine a condition or health of a specified geographical area vs. physically or virtually visiting the specified geographical area. Image data systems 29 generate unstructured data that is filtered and analyzed for relevant elements. The unstructured data is extrapolated to determine a condition for the specified geographical area. The unstructured data may identify, inter alia, a condition of a village green, a condition of residential landscaping, debris left in roadways, a condition of residential houses (e.g., paint damage, damaged shingles, etc.), etc. Additionally, historical health condition data (for the geographical area) are retained (e.g., in memory system 8 and/or data image systems 29) to determine whether the geographical area has improved its condition or has deteriorated. System 100 generates personalized assessments of geographical area conditions associated with potential activities including, inter alia, travel, home purchasing, etc. Additionally, system 100 generates (based on analysis of the unstructured data) a score based on user-defined parameters for each location (in the specified geographical area). The generated scores are plotted on a scalable map, table, or chart for reference.

System 100 enables a process for determining an overall condition of a geographical area as follows:

1. Capturing image data associated with a known location (a geographical area). The images may be captured from, inter alia, traffic cameras, security cameras, personal cameras, etc. The images may be stored in a database (e.g., within image data systems and/or memory system 8).

2. Analyzing contents within an image for discrete elements aligned to categories representative of various environmental conditions. For example, system 100 may examine each retrieved image for elements (such as, inter alia, streets, buildings, automobiles, plants, etc.) and identify an associated condition (e.g., litter in the street, broken windows in buildings, etc.).

3. Scoring each element relative to an identified "best" and "worst" case state. For example, an image illustrating a street in perfect condition with no garbage in the street may be assigned a score of "1" (i.e., a best state). Likewise, an image illustrating a street with a few potholes and some garbage in the gutters may be assigned a score a "4" (i.e., below average). Additionally, a single image may comprise multiple elements each comprising associated scores.

4. Selecting elements relevant to users. A user may select elements relevant to a subjective view of neighborhood conditions. For example, a user may define neighborhood conditions by a condition of buildings and cars with respect to street conditions, tree conditions, etc.

5. Calculating a personalized neighborhood condition score. System 100 calculates a score for each location associated with retrieved image data based on elements and weightings selected by the user.

System 100 may consume different types of input images such as, inter alia:
1. Individual images.
2. A video stream without audio.
3. A video stream that includes audio.
4. A video stream incorporating information from sensors such as, inter alia, a device responding to physical stimulus such as heat, light, sound, pressure, magnetism, and/or a particular motion.

Figure 2A:
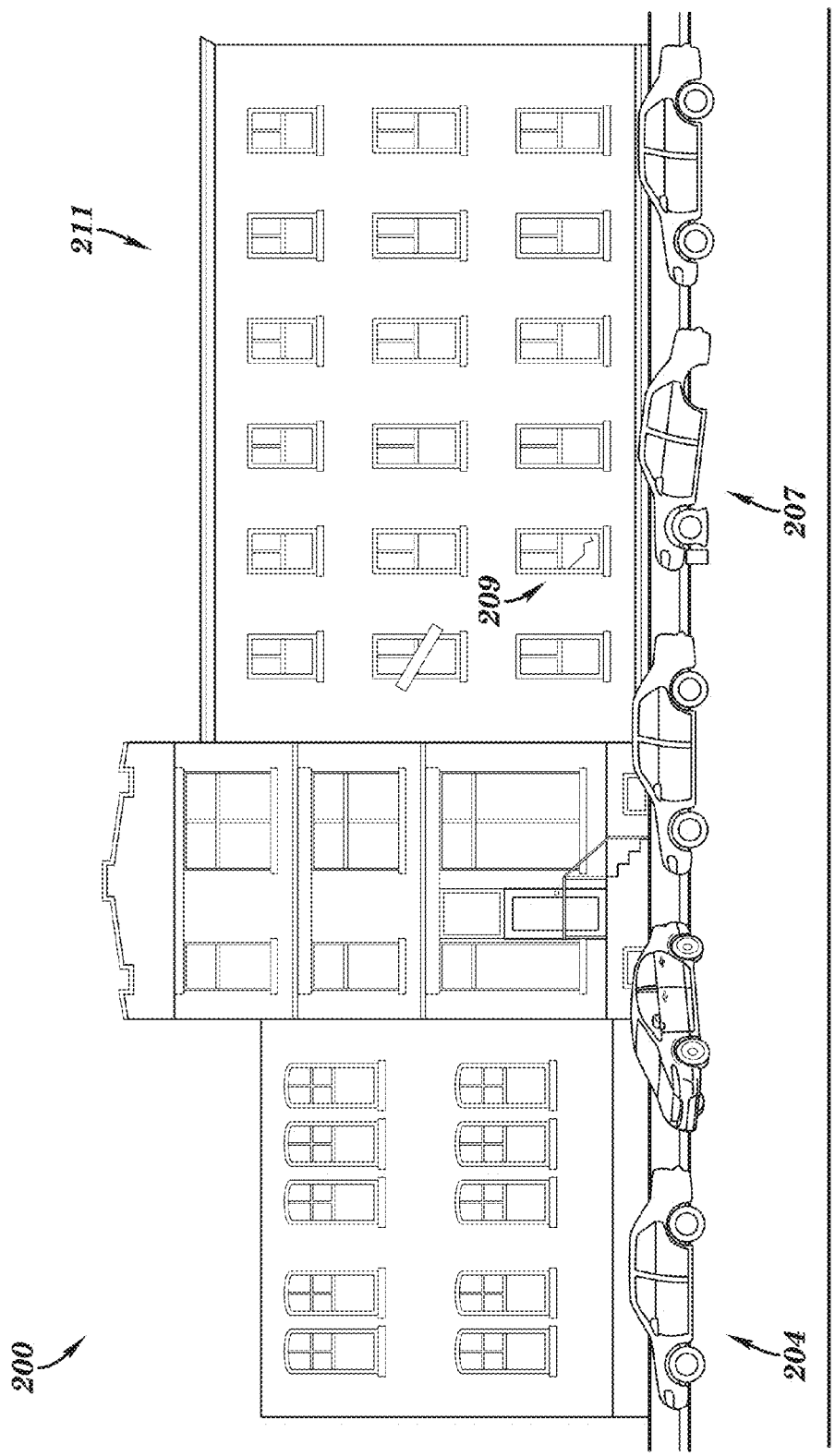
FIGS. 2A-2C illustrate an implementation example executed by the system for enabling a process for determining an overall condition of a geographical area, in accordance with embodiments of the present invention.
Figure 2B:
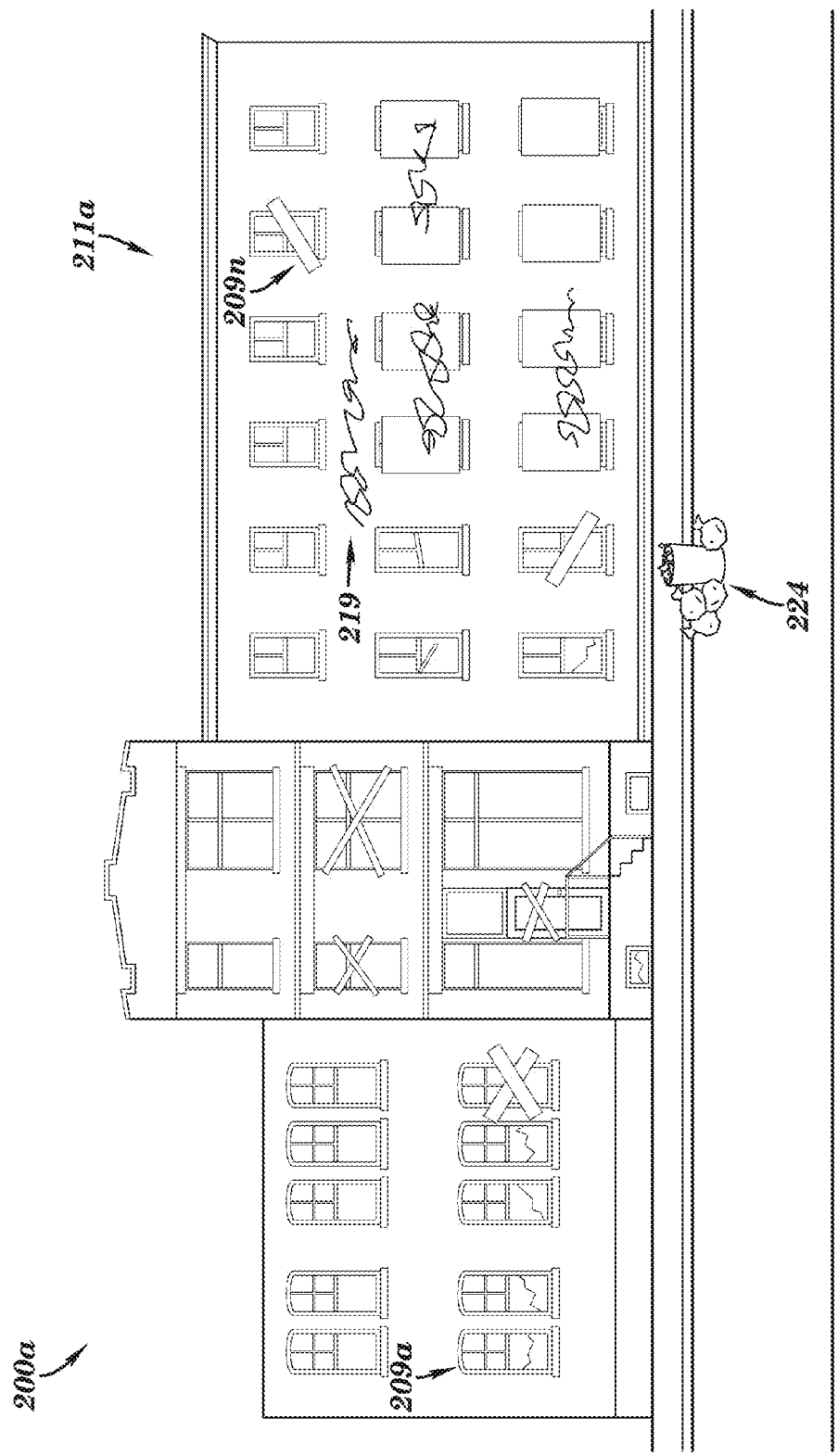
Figure 2C:
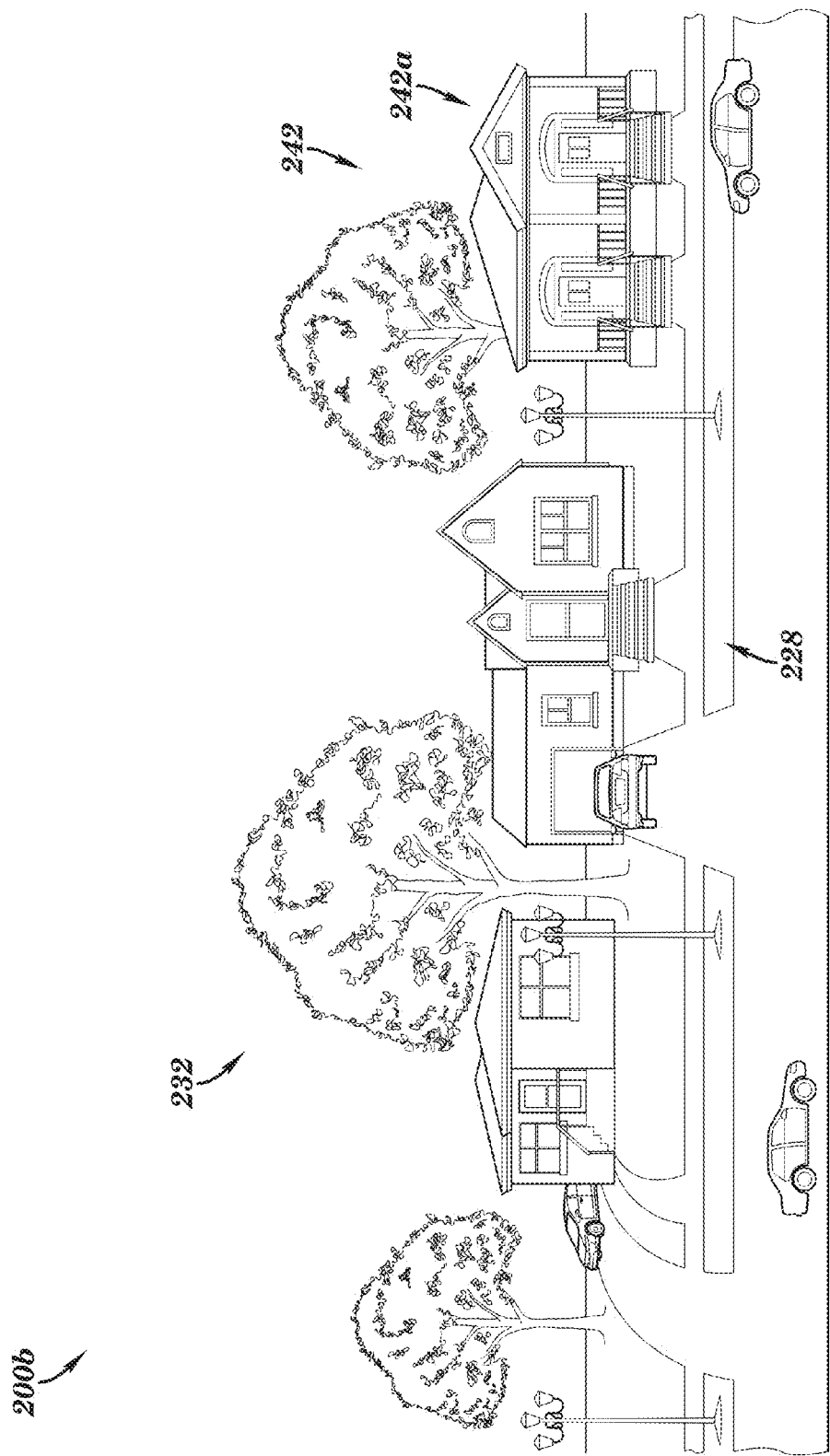

FIGS. 2A-2C illustrate an implementation example executed by system 100 for enabling a process for determining an overall condition of a geographical area, in accordance with embodiments of the present invention. The process illustrated in FIGS. 2A-2C retrieves video data from traffic cameras and geo-tagged image data from a smart phone thereby illustrating visual conditions at different locations within a specified geographical area. The visual conditions and ranked on a scale of 1-10 with a score of 1 being a most desirable condition and a score of 10 being a least desirable condition.

FIG. 2A comprises a retrieved image 200 (i.e., video data) from a first traffic camera at a first location in the geographical area. The image illustrates and identifies the following key conditions: no on street parking 204, an abandoned car 207, no street lighting, and a broken window 209 in a building 211. The key conditions are identified by identifying elements in the image and comparing the elements to a database of stored images. An algorithm is enabled for scoring each of the key conditions against a condition index comprising baseline conditions. The scores comprise values of 1 to 10 with 10 representing a high risk condition and 1 representing a low condition risk. Additionally, an average score across the key conditions is provided. For example, table 1 illustrates the key conditions receiving the following scores:

TABLE 1

| Key Condition | Condition Score |
| --- | --- |
| No Parking | 5 |
| Abandoned Car | 9 |
| No Street Lighting | 5 |
| Broken Window | 10 |

Additionally, an averaged condition score (i.e., of the condition scores in table 1) of 7.25 is calculated.

FIG. 2B comprises a retrieved image 200a (i.e., video data) from a second traffic camera at an additional location in the geographical area. The image illustrates and identifies the following key conditions: graffiti 219, broken windows 209a . . . 209n in a building 211a, and an unsecured pile of garbage 224. The following table 2 illustrates the key conditions receiving the following scores:

TABLE 2

| Key Condition | Condition Score |
| --- | --- |
| Graffiti | 7 |
| Broken Windows | 10 |
| Garbage | 4 |

Additionally, an averaged condition score (i.e., of the condition scores in table 2) of 7 is calculated.

FIG. 2C comprises a retrieved image (i.e., geo-tagged picture data) from a smart phone at an additional location in the geographical area. The image illustrates and identifies the following key conditions: neat lawns 228, maintained trees 232, maintained buildings 242 comprising maintained windows 242a.

The following table 3 illustrates the key conditions receiving the following scores:

TABLE 3

| Key Condition | Condition Score |
|---|---|
| Neat Lawns | 1 |
| Maintained Trees | 1 |
| Maintained buildings | 1 |
| Maintained Windows | 1 |

Additionally, an averaged condition score (i.e., of the condition scores in table 1) of 1.00 is calculated. Additional images and/or data (e.g., text description data) may be used by system 100 for illustrating and identifying additional key conditions such as inter alia, proximities (e.g., to a fire hydrant, busy streets, schools, hospitals, taverns, police or fire departments, manufacturing facilities, service stations, interstate highways, etc.), street conditions, nighttime visibility conditions, etc. Additional aggregate scores may be generated by averaging all of the aforementioned scores and a resulting map may be generated as described infra with respect to FIGS. 3A and 3B.

Figure 3A:
FIGS. 3A and 3B illustrate maps illustrating conditions of differing geographical areas, in accordance with embodiments of the present invention.
Figure 3B:
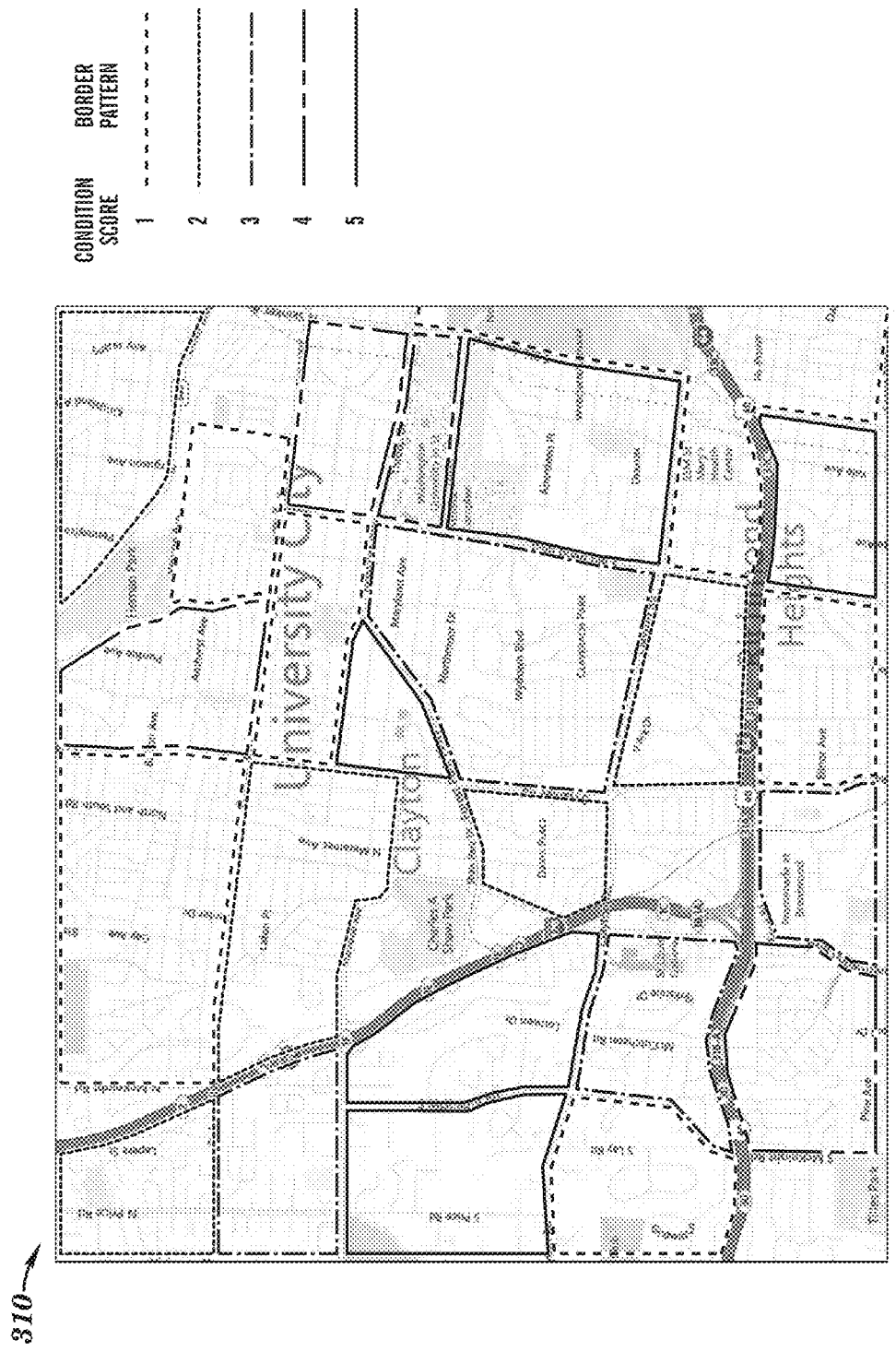

FIGS. 3A and 3B illustrate maps illustrating conditions of differing geographical areas, in accordance with embodiments of the present invention. The conditions for the geographical areas are generated based on the average aggregate scores of generated by the process described with respect to FIGS. 2A-2C.

FIG. 3A illustrates a street view map 300 describing different conditions of various geographical areas at a street level. An area comprising a condition score of 1 is bordered by dashed lines. An area comprising a condition score of 2 is bordered by dotted lines. An area comprising a condition score of 3 is bordered by alternating dot/dashed lines.

FIG. 3B illustrates a neighborhood/city view map 310 describing different conditions of various geographical areas at a neighborhood or city level. An area comprising a condition score of 1 is bordered by dashed lines. An area comprising a condition score of 2 is bordered by dotted lines. An area comprising a condition score of 3 is bordered by alternating dot/dashed lines. An area comprising a condition score of 4 is bordered by alternating differing sized dashed lines. An area comprising a condition score of 5 is bordered by solid lines.

Figure 4:
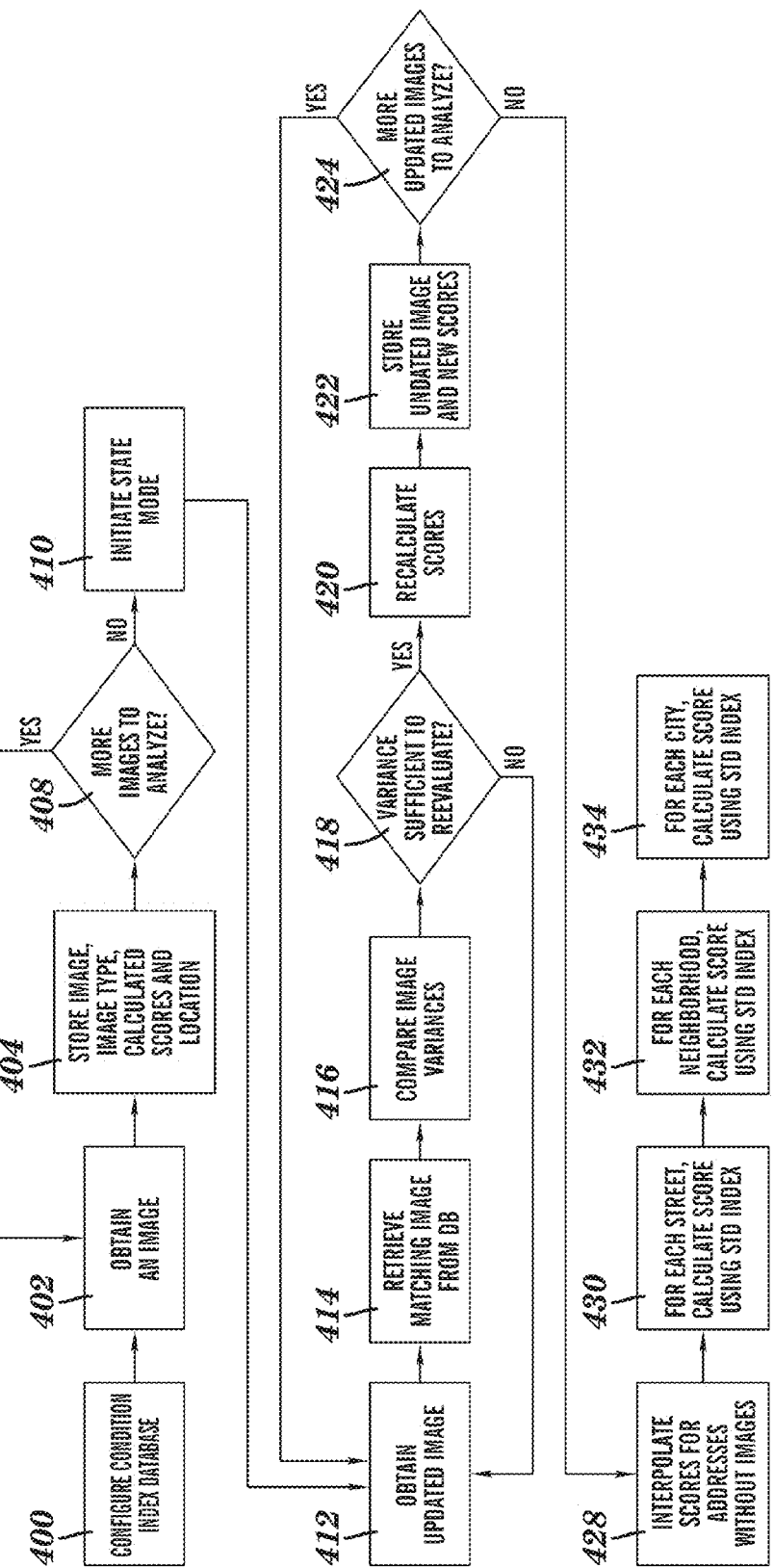
FIG. 4 illustrates an algorithm detailing a process flow enabled by the system of FIG. 1 for performing a process for scoring conditions, in accordance with embodiments of the present invention.

FIG. 4 illustrates an algorithm detailing a process flow enabled by system 100 of FIG. 1 for performing a process for scoring conditions, in accordance with embodiments of the present invention. Each of the steps in the algorithm of FIG. 4 may be enabled and executed in any order by a computer processor executing computer code. In step 400, a condition index database is configured for scoring a geographical area. In step 402, a historical image is obtained. In step 404, the historical image is stored with a preconfigured image type, a preconfigured condition score, and a specified location identifier. In step 408, it is determined if there are more images for analysis. If in step 408, it is determined that there are more images for analysis then step 402 is repeated. If in step 408, it is determined that there are no more images for analysis then step 410, a steady state mode for analysis is initiated. In step 412, an updated image is obtained. In step 414, a matching (or similar) image is retrieved from the index database. In step 416, variance values associated with the images (from steps 412 and 414) are compared. In step 418 it is determined if the variance values comprise a difference sufficient for reevaluation. If in step 418 it is determined that the variance values comprise a difference sufficient for reevaluation then step 412 is repeated. If in step 418 it is determined that the variance values do comprise a difference sufficient for reevaluation then in step 420, condition scores are recalculated. In step 422, the matching image and recalculated condition scores are stored. In step 424, it is determined if there are more updated images for analysis. If in step 424, it is determined that there are more updated images for analysis then step 412 is repeated. If in step 424, it is determined that there are no more updated images for analysis then in step 428, Scores for addresses without images are interpolated. In step 430, a condition score (for each street) in the geographical area is calculated using a standard condition index. The scores are calculated as follows: Score=(sum of house scores)/(house count)*factor(street score). In step 432, a condition score (for each neighborhood) in the geographical area is calculated using a standard condition index. The scores are calculated as follows: Score=(sum of street scores)/(street count)*factor (neighborhood score). In step 434, a condition score (for each city) in the geographical area is calculated using a standard condition index. The scores are calculated as follows: Score= (sum of neighborhood scores)/(neighborhood count)*factor (city score).

Figure 5:
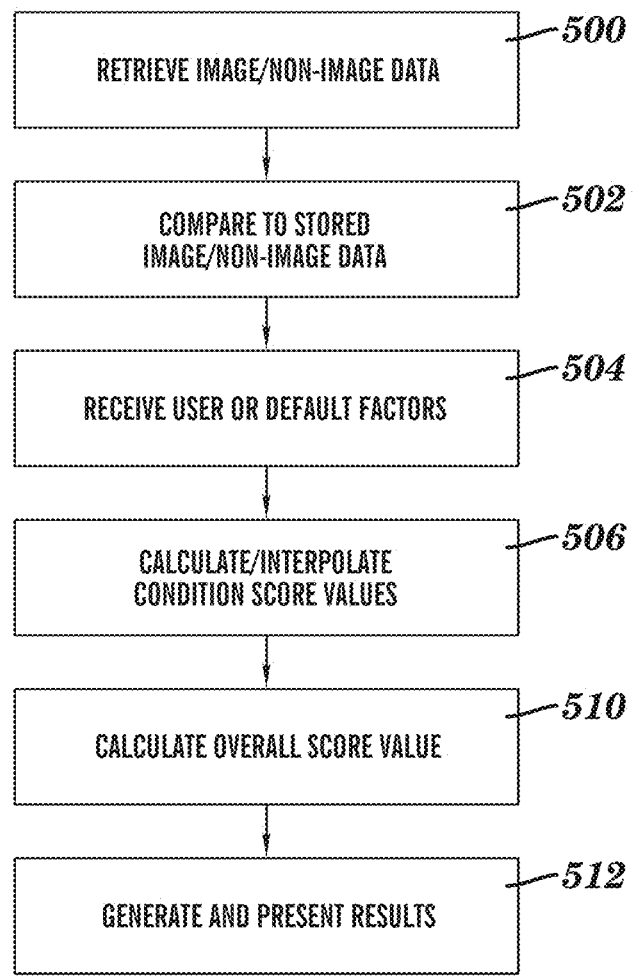
FIG. 5 illustrates an algorithm detailing a process flow enabled by the system of FIG. 1 for scoring conditions and presenting results, in accordance with embodiments of the present invention.

FIG. 5 illustrates an algorithm detailing a process flow enabled by system 100 of FIG. 1 for scoring conditions and presenting results, in accordance with embodiments of the present invention. Each of the steps in the algorithm of FIG. 5 may be enabled and executed in any order by a computer processor executing computer code. In step 500, image data associated with multiple locations within a specified geographical area is retrieved (in real time). The image data is retrieved from multiple cameras (e.g., traffic cameras, security cameras, etc.) and/or social media sources. The multiple locations may comprise, city level locations, neighborhood level locations, street level locations, etc. Additionally, non-image data files associated with the multiple locations may be retrieved. In step 502, the image data is compared to stored image data. The stored image data include baseline measurement values associated with an expected condition level of baseline locations within a baseline geographical area. Variance associated with differences between attributes of the image data with respect to the stored image data may be determined and compared to a specified threshold to determine further processing. Additionally, the non-image data files are analyzed with respect to an expected condition level of baseline locations within a baseline geographical area. In step 504, user input factors or default factors (associated with geographical condition attributes) are received. In step 506, condition score values associated with the multiple locations are calculated (with respect to the image data) or interpolated (with respect to the non-image data) based on results of steps 502, 504, and 506. The condition score values indicate real time condition values associated with the multiple locations. Additionally, street condition scores associated with streets located within the specified geographical area and neighborhood condition scores associated with neighborhoods comprising the streets are calculated. In step 510, an overall condition score value associated with the specified geographical area is calculated based on the condition score values, street condition scores, and neighborhood condition scores. The overall condition score value may comprise a weighted summation of the neighborhood condition scores. In step 512, a map (chart or table) indicating the overall condition score value associated with the specified geographical area is generated and presented to a user. The map (chart or table) may present the overall condition score value as various different attributes (in the specified geographical area) including, inter alia, differing colors, special representations, graphical objects, etc.

Figure 6:
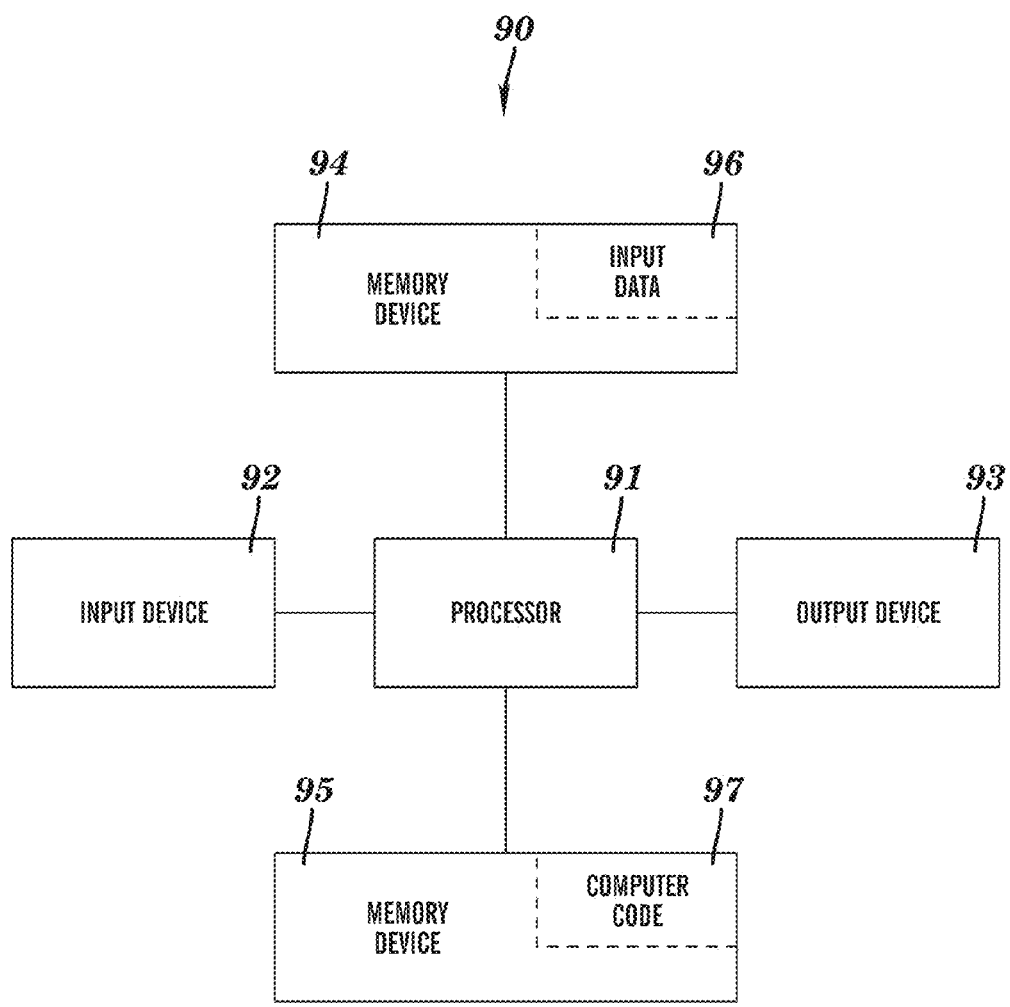
FIG. 6 illustrates a computer system used by or comprised by the system of FIG. 1 for enabling a process for scoring conditions and presenting results, in accordance with embodiments of the present invention.

FIG. 6 illustrates a computer system 90 used by or comprised by the system of FIG. 1 for enabling a process for scoring conditions and presenting results, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 4 and 5) for enabling a process for scoring conditions and presenting results. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may include the algorithms of FIGS. 4 and 5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to enable a process for scoring conditions and presenting results. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for scoring conditions and presenting results. In another embodiment, the invention provides a business method that performs the process steps of the invention on a subscription, advertising, and/or fee basis. That is, a service supplier, such as a Solution Integrator, could offer to enable a process for scoring conditions and presenting results. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   retrieving in real time, by a computer processor of a computing system, image data associated with a plurality of locations within a specified geographical area;
   comparing, by said computer processor, said image data to a plurality of stored image data, wherein said plurality of stored image data comprise baseline measurement values associated with an expected condition level of baseline locations within a baseline geographical area;
   calculating, by said computer processor based on results of said comparing, condition score values associated with said plurality of locations, wherein said condition score values indicate real time condition values associated with said plurality of locations;
   calculating, by said computer processor based on said condition score values, an overall condition score value associated with said specified geographical area; and
   generating, by said computer processor, a map indicating said overall condition score value associated with said specified geographical area.

2. The method of claim 1, wherein said image data are retrieved from a plurality of cameras located within various locations within said specified geographical area.

3. The method of claim 2, wherein said image data are further retrieved from social media sources.

4. The method of claim 1, wherein said results of said comparing indicate a variance between attributes of said image data and attributes of said plurality of stored image data, and wherein said variance exceeds a specified threshold.

5. The method of claim 1, further comprising:
   retrieving in real time, by said computer processor, non-image data files associated with said plurality of locations within said specified geographical area;
   analyzing, by said computer processor, said non-image data files; and
   interpolating, by said computer processor based on results of said analyzing, condition values associated with said plurality of locations, wherein said calculating said condition score values is further based on said condition values.

6. The method of claim 1, wherein said calculating said condition score values comprises:
   calculating street condition scores associated with streets located within said specified geographical area and neighborhood condition scores associated with neighborhoods comprising said streets, wherein said overall condition score value comprises a weighted summation of said neighborhood condition scores.

7. The method of claim 1, further comprising:
   receiving, by said computer processor from a user, user selections associated with geographical condition attributes, wherein said calculating said condition score values is further based on said user selections.

8. The method of claim 1, further comprising:
presenting, by said computer processor to a user said map, wherein said map presents said overall condition score value as various different attributes in said specified geographical area.

9. The method of claim 8, wherein said various different attributes comprise attributes selected from the group consisting of colors, special representations, and graphical objects.

10. The method of claim 1, further comprising:
providing at least one support service for at least one of creating, integrating, hosting, maintaining, and deploying computer-readable code in the computing system, said code being executed by the computer processor to implement: said retrieving, said comparing, said calculating said condition score values, said calculating said overall condition score value, and said generating.

11. A computing system comprising a computer processor coupled to a computer-readable memory unit, said memory unit comprising instructions that when executed by the computer processor implements a method comprising:
retrieving in real time, by said computer processor, image data associated with a plurality of locations within a specified geographical area;
comparing, by said computer processor, said image data to a plurality of stored image data, wherein said plurality of stored image data comprise baseline measurement values associated with an expected condition level of baseline locations within a baseline geographical area;
calculating, by said computer processor based on results of said comparing, condition score values associated with said plurality of locations, wherein said condition score values indicate real time condition values associated with said plurality of locations;
calculating, by said computer processor based on said condition score values, an overall condition score value associated with said specified geographical area; and
generating, by said computer processor, a map indicating said overall condition score value associated with said specified geographical area.

12. The computing system of claim 11, wherein said image data are retrieved from a plurality of cameras located within various locations within said specified geographical area.

13. The computing system of claim 12, wherein said image data are further retrieved from social media sources.

14. The computing system of claim 11, wherein said results of said comparing indicate a variance between attributes of said image data and attributes of said plurality of stored image data, and wherein said variance exceeds a specified threshold.

15. The computing system of claim 11, wherein said method further comprises:
retrieving in real time, by said computer processor, non-image data files associated with said plurality of locations within said specified geographical area;
analyzing, by said computer processor, said non-image data files; and
interpolating, by said computer processor based on results of said analyzing, condition values associated with said plurality of locations, wherein said calculating said condition score values is further based on said condition values.

16. The computing system of claim 11, wherein said calculating said condition score values comprises:
calculating street condition scores associated with streets located within said specified geographical area and neighborhood condition scores associated with neighborhoods comprising said streets, wherein said overall condition score value comprises a weighted summation of said neighborhood condition scores.

17. The computing system of claim 11, wherein said method further comprises:
receiving, by said computer processor from a user, user selections associated with geographical condition attributes, wherein said calculating said condition score values is further based on said user selections.

18. The computing system of claim 11, wherein said method further comprises:
presenting, by said computer processor to a user said map, wherein said map presents said overall condition score value as various different attributes in said specified geographical area.

19. The computing system of claim 18, wherein said various different attributes comprise attributes selected from the group consisting of colors, special representations, and graphical objects.

20. A computer program product, comprising a computer readable hardware storage device storing a computer readable program code, said computer readable program code comprising an algorithm that when executed by a computer processor of a computing system implements a method, said method comprising:
retrieving in real time, by said computer processor, image data associated with a plurality of locations within a specified geographical area;
comparing, by said computer processor, said image data to a plurality of stored image data, wherein said plurality of stored image data comprise baseline measurement values associated with an expected condition level of baseline locations within a baseline geographical area;
calculating, by said computer processor based on results of said comparing, condition score values associated with said plurality of locations, wherein said condition score values indicate real time condition values associated with said plurality of locations;
calculating, by said computer processor based on said condition score values, an overall condition score value associated with said specified geographical area; and
generating, by said computer processor, a map indicating said overall condition score value associated with said specified geographical area.

* * * * *